United States Patent [19]

Szewczykowski

[11] Patent Number: 6,039,249
[45] Date of Patent: *Mar. 21, 2000

[54] METHOD FOR IDENTIFYING COUNTERFEIT NEGOTIABLE INSTRUMENTS

[76] Inventor: Jerzy Szewczykowski, 2600 Netherland Ave., #1117, Riverdale, N.Y. 10463

[*] Notice: This patent is subject to a terminal disclaimer.

[21] Appl. No.: 09/165,416

[22] Filed: Oct. 2, 1998

Related U.S. Application Data

[63] Continuation of application No. 08/758,347, Dec. 3, 1996, Pat. No. 5,818,021.

[51] Int. Cl.⁷ ..................................................... G06K 5/00
[52] U.S. Cl. ........................... 235/379; 235/380; 235/382; 235/462.01; 705/35
[58] Field of Search ..................................... 235/379, 380, 235/382, 375, 454, 462.01, 493, 494; 705/35, 44, 45

[56] References Cited

U.S. PATENT DOCUMENTS

| | | | |
|---|---|---|---|
| 4,013,894 | 3/1977 | Foote et al. | 250/569 |
| 4,472,626 | 9/1984 | Frid | 235/379 |
| 4,562,340 | 12/1985 | Tateisi et al. | 235/39 |
| 4,630,201 | 12/1986 | White | 235/379 |
| 4,912,310 | 3/1990 | Uemura et al. | 235/680 |
| 5,044,668 | 9/1991 | Wright | 282/58 |
| 5,130,519 | 7/1992 | Bush et al. | 235/380 |
| 5,175,682 | 12/1992 | Higashiyama et al. | 235/379 |
| 5,310,999 | 5/1994 | Claus et al. | 235/384 |
| 5,337,358 | 8/1994 | Axelrod et al. | 380/23 |
| 5,367,148 | 11/1994 | Storch et al. | 235/379 |
| 5,442,162 | 8/1995 | Armel | 235/381 |
| 5,491,325 | 2/1996 | Huang et al. | 235/379 |
| 5,789,727 | 8/1998 | Teradaira et al. | 235/449 |

*Primary Examiner*—Donald Hajec
*Assistant Examiner*—Daniel St. Cyr
*Attorney, Agent, or Firm*—Pollock, Vande Sande & Amernick

[57] ABSTRACT

The invention comprises a method for determining whether a negotiable instrument is counterfeit. The method includes the step of placing on the instrument an identifying tag, preferable and RF-ID tag, and also a magnetic strip capable of storing information. The method also includes the step of recording on the RF-ID tag at least one computer generated, preferably random number and/or a number related to the date and time (e.g. the year, month, date, hour, minute, and second) of its being printed. Alternatively, or additionally, the information recorded on the instrument's magnetic strip is associated with the number of encounters since issuance into public use. This information thus recorded on the instrument is stored in a secure computer database record corresponding to the specific instrument. Each time a bank transaction of the instrument takes place, the instrument is scanned. If the information obtained from the instrument upon scanning matches the random numbers obtained from the database record, then a transaction is authorized. That is, following the successful outcome of the first comparison, the transaction count obtained from the instrument is verified against the transaction count fetched from the database record. If any one of the comparisons fail, then the instrument may deemed as invalid. Otherwise, the instrument is cleared, and the transaction count is incremented and updated both on the instrument and in the database record in preparation for a subsequent transaction and processing.

2 Claims, 1 Drawing Sheet

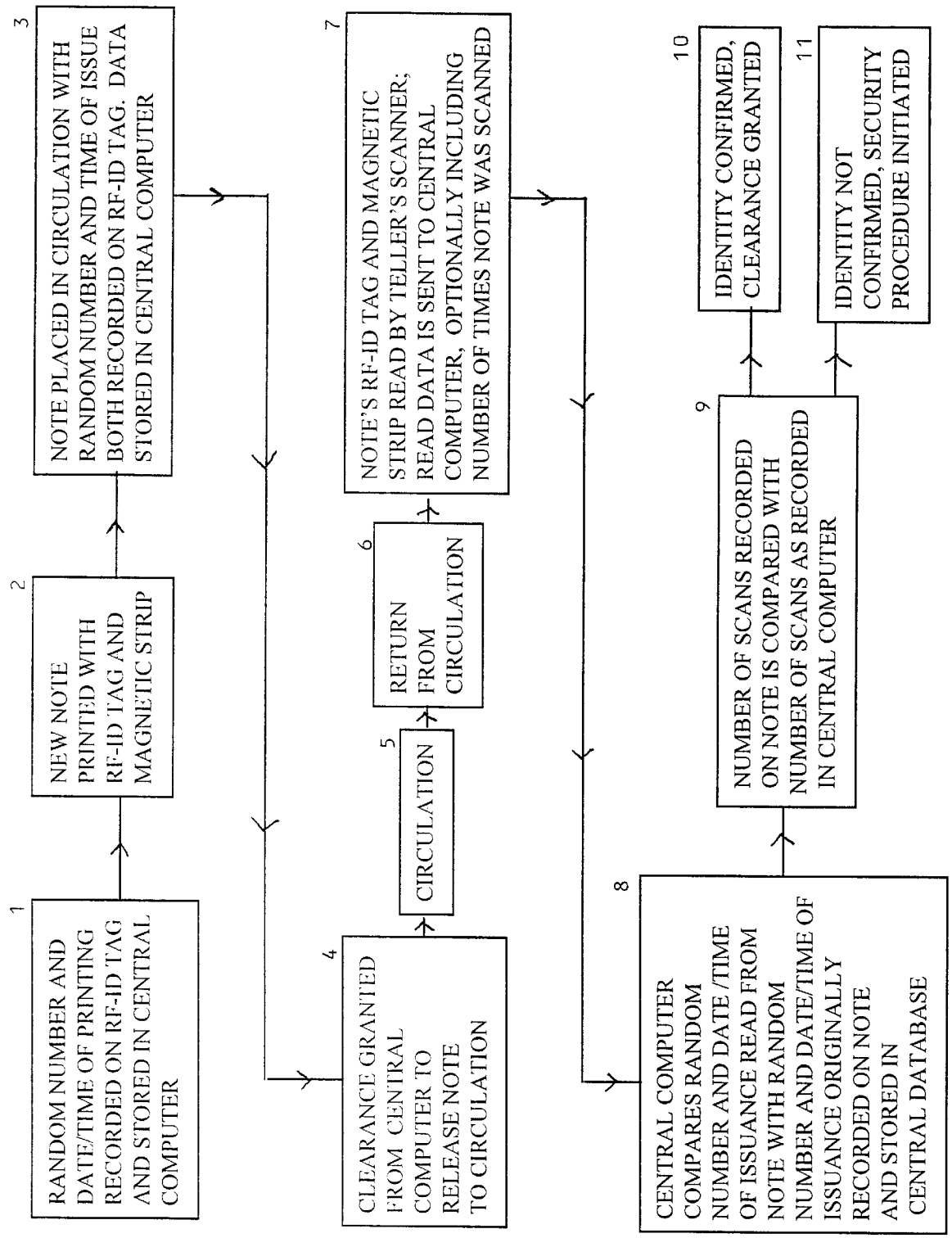

METHOD FOR IDENTIFYING COUNTERFEIT NEGOTIABLE INSTRUMENTS

This application is a continuation of U.S. application Ser. No. 08/758,347, filed Dec. 3, 1996, now U.S. Pat. No. 5,818,021.

FIELD OF THE INVENTION

This invention broadly relates to authentication of a negotiable instrument and, in particular, to a method and means for determining whether a note, e.g. a U.S. Treasury note, or the like, is counterfeit. The inventive method comprises the issuance of notes bearing distinctive data such as a random number together with the added exact time of issuance of the specific note, such distinctive data preferably being permanently recorded on a radio frequency (RF) tag, hereinafter referred to as an "RF-ID+29", included on each note.

Preferably, each note is also provided with a magnetic strip to record information which can readily be updated upon each scan by appropriate apparatus. Both the permanent data stored on a note's RF-ID tag, and the changeable data recorded on a note's magnetic strip, are stored in a database and thus readily available for comparison with data read from the note when later presented by a holder to a bank or the like.

BACKGROUND OF THE INVENTION

Detection of counterfeit notes is currently a major concern. The counterfeiting of notes has become a perpetual problem not only in the United States but in many other countries. For example, Russia claims to be the second largest holder of U.S. currency in the world after the U.S.; however, it is recognized that much of this Russian-held U.S. currency is counterfeit.

Professionally made counterfeit notes are almost indistinguishable from valid notes and are extremely hard to detect even when very sophisticated detection equipment is employed. Thus, the challenge to governments and commerce directly affected by counterfeit notes are frequent and significant, particularly because counterfeiters and forgers always attempt to stay one step in advance of the latest counterfeit detection equipment.

Devices and methods for detecting counterfeit notes are the subject of several U.S. patents. A representative system is described in U.S. Pat. No. 5,491,325 to Huang et al. It discloses a method and system for payment and payment verification, including the steps of determining an index code which uniquely identifies the payment document and serves as an index into a data file; generating the data file using at least payment information associated with the payment document; imprinting the index code on the payment document; communicating the data file to a verification system; reading the index code from the payment document at the verification location; and verifying the authenticity of the payment document by accessing the data file and determining whether the read index code correctly identifies the payment document as an authorized payment document. The present invention is believed to provide significant advantages over this prior technology.

SUMMARY OF THE INVENTION

The method of the present invention for identifying whether a note is counterfeit includes the steps of:

(a) generating a random number and combining therewith a number which represents the exact moment of creation of the note;

(b) embedding in the note, preferably on an RF-ID tag as described above, the numbers referred to in (a) above, either separately or in a combined form;

(c) optionally embedding a magnetic strip in the note to store data updates;

(d) and storing the generated random number, and note creation time, in a highly secure database.

Each time the note is presented to a bank teller for collection or disposition, the data on the note's RF-ID is machine-read by means of a scanning operation and transmitted to a central computer normally under control of the governmental department having supervision over the printing of currency. A determination is then made as to whether the data on the RF-ID strip includes the above-mentioned random number together with the time of the note's creation and, if so, whether the data so read corresponds to the data for that note stored in the database.

Further, a determination may be made as to whether the identifying information recorded in the database includes a transaction count for the specific note which matches the transaction count recorded on the magnetic strip for that note. If so, the steps of incrementing and updating the transaction count on the magnetic strip and in the database record are performed and the note is verified to the holder as being authentic.

Optionally, in accordance with a further aspect of the present invention, the inventive method may further include the step of recording on the magnetic strip the transaction place/date/time data specifying when and where the note was the subject of a transaction between the banking institution and a holder.

BRIEF DESCRIPTION OF THE DRAWING

The above-mentioned features, as well as additional advantages and features of the present invention, will be evident and more clearly understood when considered in conjunction with the accompanying drawing comprising a detailed flowchart of the inventive steps of the invention, from the initial printing of the note until it has been presented to a bank or the like for payment.

DESCRIPTION OF THE PREFERRED EMBODIMENT

The inventive method for detecting counterfeit currency includes various steps. An initial step, occurring at the time of printing of a note, is the generation of a random number which is combined in a predetermined manner with the exact instant of time of the note's creation. A further step is the embedding, preferably in an RF-ID tag incorporated within the note at the time of its manufacture, of the above-described data. The next step is the issuance of the new note at the appropriate governmental agency, such as the Bureau of Printing and Engraving in the United States, with the note having incorporated therein the RF-ID tag with the above-mentioned permanently recorded ID numbers, and also the preferable attachment to the note of a magnetic strip for storing changeable information. This strip may be similar to magnetic strips commonly found, for example, on fare cards.

The random number placed on the RF-ID tag, supplemented by the date and clocktime of the note's issuance, must be generated by a highly secure central computer.

According to the preferred embodiment of the invention, the magnetic strip on the note is used to record the number of encounters of the note with the appropriate teller's scanning device. All such collected information is transferred to the highly secure central database referred to above, and a signal is returned to the teller to confirm whether the presented note is authentic or counterfeit. Each time the issued note is presented to a bank teller, the information stored on the RF-ID tag and on the magnetic strip is: (a) automatically scanned by the bank teller's scanning device; (b) the read information is transmitted to the central secure computer; (c) the transmitted information is compared with the stored data for that note in the database, specifically the comparison by the computer of the random number and the note's exact time of creation stored on the RF-ID tag with the corresponding data for that specific note in the central database; and (d) clearance of the note if both sets of information correspond. If both sets do not correspond, the note is deemed to be counterfeit.

With each passage of a particular note through the automatic scanner, the number of encounters is increased and updated on the note's magnetic strip and, at the same time, is updated in the central database.

As a next step, a determination may optionally be made as to whether the transaction count recorded in the database matches the transaction count recorded on that particular note's magnetic strip. If there is a match, the steps for incrementing and updating the transaction count on the magnetic strip and in the database record are performed and the note is cleared for transaction.

In accordance with the present invention, the inventive method may further optionally include the extra steps of recording on the note's magnetic strip and in the database: the transaction time, the transaction place, and the holder's Social Security or passport number. The inventive method may also include procedures for invisibly detecting the possession of large numbers of notes when the holder crosses an international border using the RF-ID tags on the individual bills in the holder's possession.

DETAILED DESCRIPTION OF THE INVENTION

The accompanying block diagram shows a detailed sequencing flowchart from the initial printing of a note until its release to the public and its being subjected to a transaction.

As shown in blocks 1 and 2, a new negotiable instrument such as a note is preferably printed with an RF-ID tag thereon, and preferably also a magnetizable strip. The tag has recorded thereon a unique number and also the exact date/time of issuance of the note's creation. The unique number and the date/time number of printing may be separately recorded on the note or, preferably, they are combined in a predetermined manner which permits their being unscrambled at the time of checking of the note's authenticity only by authorized agencies. The recorded data thus placed on the note is permanently also stored in a highly secure database. Thus, in step 2, a new note is printed and an RF-ID tag and a magnetic strip attached thereto. Such data is permanently stored on the note. The magnetic strip printed on the note is capable of having information recorded onto it and to be retrieved, i.e. "read" by an appropriate electronic device, in a manner also well known to one skilled in the art.

In block 3, the similar information related to the note is also read into the database. When the data is thus stored on the note and in the database, the note is cleared for distribution to the public as exemplified by steps 4 and 5.

Block 6 represents the presentation of a note's holder to a commercial bank.

As shown in block 7, when the note is presented to a bank for payment, the recorded data is read and transmitted by the teller's scanner to the central computer which stores all the above-mentioned data associated with issued bills. As shown, the number of times that the note has been scanned may also optionally be transmitted to the database.

As shown in block 8, the central computer, upon receiving this data, searches in the secure database for the identical combination of random number plus date/time data read from the scanned bill's RF-ID tag. Upon finding such identical combination of random number/date/time, it can confirm the genuineness of the scanned bill. Optionally, if the system provides that further data is to be associated with the note, for example the number of times that the note has been scanned, then such data read from the bill may, additionally or alternatively, be compared to the related data stored in the database as illustrated in block 9.

The time recordation of previous transactions involving the note provides an immediate and easy access to the complete history of the note. This procedure greatly deters counterfeiters from making or using counterfeit notes.

Block 10 shows that confirmation of the data on the note with that stored in the database results in a clearance signal being granted. Block 11 shows when identity of the data stored on the note does not correspond with the stored data in the secure database. In that event, appropriate security procedures are initiated.

The transfer of information to/from the central computer and the database is preferably done by optical equipment using fiber optic cables.

Optionally, the transmission of data may be by use of spot-beam satellite transmission. Optical data transmission will virtually prevent any tampering with sensitive information which might occur with conventional electronic transmission devices and methods, such as radio-frequency or telephone lines. Furthermore, the equipment for conversion between electrical and optical signals must be given the utmost level of protection in order not to compromise the sensitive information concerning the notes.

It should be understood that the formation for the date/time recordation of each transaction may include any combination of the year, month, day, hour, minute and second. Furthermore, any number and/or combination of alphanumeric characters may be used as random numbers, as previously stated.

Since those skilled in the art can modify the disclosed specific embodiment without departing from the spirit of the invention, it is, therefore, intended that the claims be interpreted to cover such modifications and equivalents.

What is claimed is:

1. A method for identifying whether a specific document is genuine, comprising the steps of:

permanently embedding in each said document at the time of creation a device readable, multiple digit first number;

permanently also embedding in said specific document at the time of its creation a device readable, multiple digit unique second number derived from a predetermined sequence of numbers;

at least one of said first and second numbers being a random number;

storing in a secure database for each issued document said first and second embedded numbers as being related to a specific document;

at the time of initial presentation of said specific document reading said first and second embedded unique numbers both embedded on said document and storing said numbers to said database;

determining from said database whether said embedded numbers read from said document are uniquely paired with each other;

creating a validity signal only when such pairing is found to exist and instead transmitting an invalidity signal only when such pairing is found not to exist.

2. A method for identifying whether a specific document is genuine, comprising the steps of:

permanently embedding in each said specific document at the time of its creation a device readable, multiple digit unique first number;

permanently also embedding in said specific document at the time of its creation a device-readable, multiple digit unique second number dependent, at least in part, upon the clock time of creation of said specific document;

at least one of said first and said second member being a random number;

storing in a secure database for each said specific document said first and second embedded numbers as being uniquely paired with each other;

at the time of initial presentation of said specific document, reading said first and second embedded unique numbers on said specific document and transmitting said numbers to said database;

determining from said secure data base whether said embedded numbers read from said specific document are uniquely paired with each other; and creating an invalidity signal only when such pairing is found not to exist.

* * * * *